July 31, 1962

N. L. PETERSON ET AL 3,047,729

VOLTAGE CONTROL SYSTEM

Filed April 6, 1959

2 Sheets-Sheet 1

Inventors.
Norman L. Peterson.
Charles E. Smith.
By H R Rather
Attorney.

July 31, 1962   N. L. PETERSON ET AL   3,047,729
VOLTAGE CONTROL SYSTEM

Filed April 6, 1959   2 Sheets-Sheet 2

Inventors.
Norman L. Peterson
Charles E. Smith
By H. R. Rutter
Attorney.

United States Patent Office 3,047,729
Patented July 31, 1962

3,047,729
VOLTAGE CONTROL SYSTEM
Norman L. Peterson, Wauwatosa, and Charles E. Smith, Milwaukee, Wis., assignors to Cutler-Hammer, Inc., Milwaukee, Wis., a corporation of Delaware
Filed Apr. 6, 1959, Ser. No. 804,299
14 Claims. (Cl. 307—18)

This invention relates to voltage control systems and more particularly to control systems providing a plurality of diversely controlled output voltages in response to an adjustable input voltage.

While not limited thereto, the invention is especially applicable to cross-over control in an adjustable voltage control system for a direct current motor of the type affording speed control by adjustment of the armature voltage and field weakening.

A general object of the invention is to provide an improved voltage control system of the modular type.

A more specific object of the invention is to provide an improved voltage control system of the semi-conductor controlled type.

Another specific object of the invention is to provide an improved voltage control system employing semi-conductor devices and affording a plurality of diversely controlled output voltages in response to an adjustable input voltage.

Another object of the invention is to provide an improved cross-over circuit of the semi-conductor controlled type for use in an adjustable voltage motor control system which responds to a linearly adjustable input voltage to provide a first output voltage which varies linearly to control the armature voltage and to provide a second output voltage which varies non-linearly to control the shunt field energization substantially in accordance with the inherent field current-speed characteristic of the motor to afford linear speed control.

A further object of the invention is to provide such cross-over circuit which maintains the second output voltage substantially at zero value throughout the first output voltage range and maintains the first output voltage substantially constant at a predetermined value throughout the second output voltage range.

Other objects and advantages of the invention will hereinafter appear.

While the apparatus hereinafter described is effectively adapted to fulfill the objects stated, it is to be understood that we do not intend to confine our invention to the particular preferred embodiment of voltage control system disclosed, inasmuch as it is susceptible of various modifications without departing from the scope of the appended claims.

Figure 1:
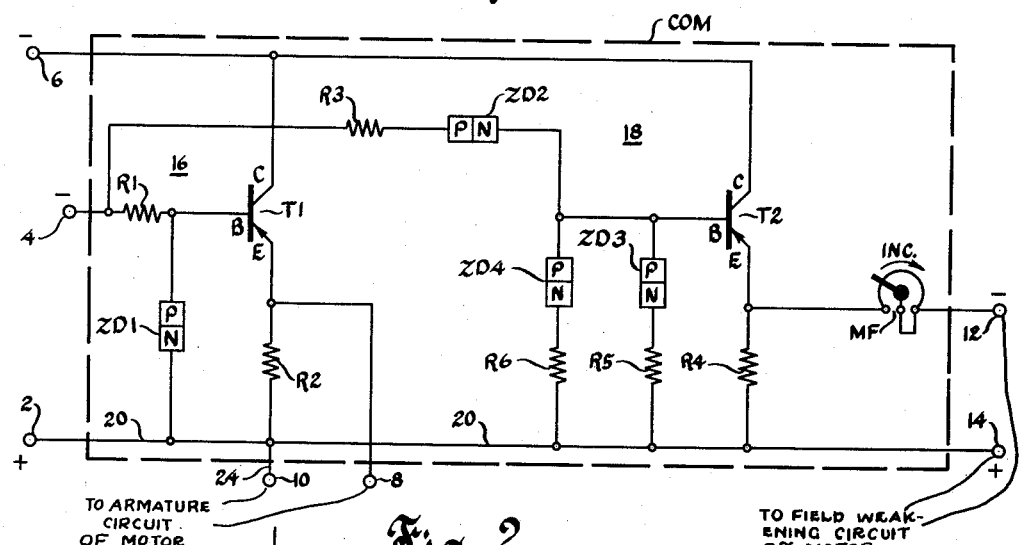
Figure 2:
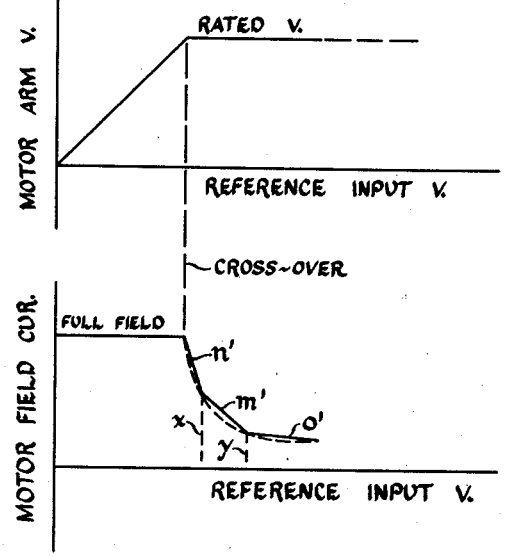
Figure 3:
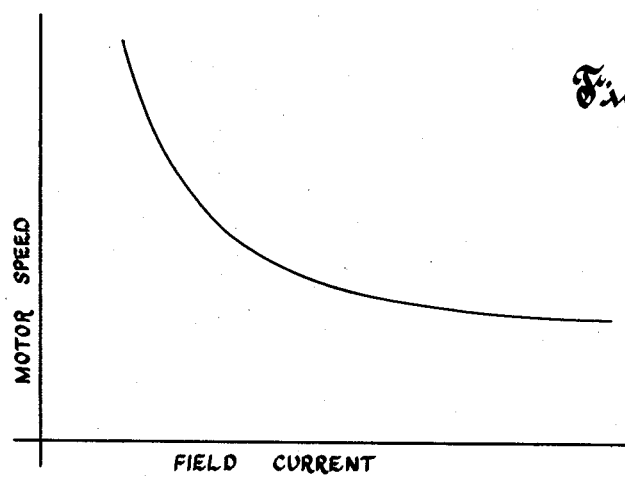
Figure 4:
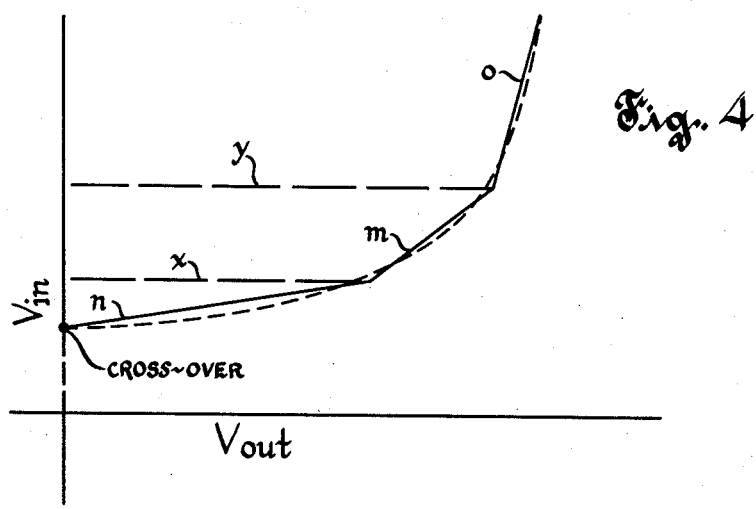

A preferred embodiment of the invention will now be described in detail with reference to accompanying drawings, wherein:

FIGURE 1 diagrammatically depicts a voltage control system constructed in accordance with the invention; and FIGS. 2, 3 and 4 graphically depict the operating characteristics of the system of FIG. 1.

Referring to FIG. 1, there is shown a modular cross-over circuit COM adapted to be embedded in plastic material and having external input terminals 2, 4 and 6 and a first pair of external output terminals 8 and 10 and a second pair of external output terminals 12 and 14. Input terminals 2 and 6 may be connected to the positive and negative sides, respectively, of a suitable source of unidirectional supply voltage and input terminals 2 and 4 may be connected to the positive and negative sides, respectively, of an adjustable unidirectional reference input voltage source.

Cross-over circuit COM is provided with a first output voltage control portion 16 which is adapted to be connected to control the armature voltage of a shunt-wound motor and a second output voltage control portion 18 which is adapted to be connected to control the field weakening of such motor in order to control the motor speed. Portion 16 is provided with a semi-conductor device such as a transistor T1 of the P-N-P conductivity type or the like having an emitter electrode E, a base electrode B and a collector electrode C. Reference voltage input terminal 4 is connected through a resistor R1 to base electrode B. Common potential input terminal 2 is connected through a common conductor 20 and a resistor R2 to emitter electrode E and collector electrode C of transistor T1 is connected directly to negative supply voltage input terminal 6. Common conductor 20 is connected through a semi-conductor device such as a Zener diode ZD1 of the P-N conductivity type or the like to base electrode B of transistor T1. Emitter electrode E is connected through a conductor 22 to output terminal 8 and the other output terminal 10 for this portion of the cross-over circuit is connected through conductor 24 to common conductor 20. Thus, the output voltage of portion 16, or the motor armature reference voltage output, is obtained across emitter resistor R2 as hereinafter more fully described.

Portion 18 of the cross-over circuit is provided with a semi-conductor device such as a transistor T2 of the P-N-P conductivity type or the like having an emitter electrode E, a base electrode B and a collector electrode C. Reference input terminal 4 is connected through a resistor R3 and a semi-conductor device such as a Zener diode ZD2 of the P-N conductivity type or the like (similar to diode ZD1) to base electrode B. Common potential input terminal 2 is connected through common conductor 20 and a resistor R4 to emitter electrode E and collector electrode C of transistor T2 is connected directly to negative supply voltage input terminal 6. Common conductor 20 is connected through a resistor R5 and a semi-conductor device such as a Zener diode ZD3 of the P-N conductivity type or the like in series to base electrode B of transistor T2. Another serially-connected resistor R6 and semi-conductor device such as a Zener diode ZD4 of the P-N conductivity type or the like are connected in parallel with resistor R5 and diode ZD3. Diodes ZD3 and ZD4 are preferably similar to diodes ZD1 and ZD2 except that they differ therefrom and from one another in their voltage response characteristics as hereinafter more fully described in connection with the description of operation of the system.

Emitter electrode E of transistor T2 is connected through an adjustable rheostat MF to output terminal 12, the movable arm of rheostat MF being connected to the side thereof which is also connected to terminal 12. The other output terminal 14 for this portion of the cross-over circuit is connected to common conductor 20. Thus, the output voltage of portion 18, or the motor field reference voltage output, is obtained across emitter resistor R4 as hereinafter more fully described. Rheostat MF is employed to adjust the maximum output voltage of portion 18 of the cross-over circuit and the minimum motor field energization when the latter is employed in a motor control system. As hereinafter more fully described, full field energization is normally supplied from a controllable power supply source and the field reference voltage obtained from cross-over circuit portion 18 is employed to weaken the motor field. Therefore, movement of the movable arm of rheostat MF clockwise in the direction of the arrow increases the minimum motor field energization as indicated by the legend by adding resistance in the output circuit thereby to decrease the maximum output voltage of portion 18 and, consequently, decrease the amount of field weakening that can be effected by adjustment of the reference input voltage to the cross-over circuit.

The operation of the system of FIG. 1 will now be described, reference being made to the curves in FIGS. 2, 3 and 4 wherein the operating characteristics of the system are graphically illustrated. Let it be assumed that a source of constant unidirectional voltage is connected to supply terminals 2 and 6 and that an adjustable reference input voltage is connected across terminals 2 and 4.

This reference input voltage is applied across the emitter and base electrodes of transistor T1 in a circuit extending through common conductor 20, resistor R2, emitter E, base B and resistor R1. This input voltage is also applied through common conductor 20 and resistor R1 across Zener diode ZD1 in the reverse direction. As a result of the positive bias voltage applied to the emitter of transistor T1, the latter is rendered conducting in a circuit extending from terminal 2 through common conductor 20, resistor R2 and emitter E and collector C to negative supply terminal 6. The voltage drop across resistor R2 which corresponds to the low impedance output voltage of cross-over circuit portion 16 is applied through conductors 22 and 24 to output terminals 8 and 10. Resistor R2 also supplies negative feedback to transistor T1 to stabilize the output voltage at terminals 8 and 10.

When the reference input voltage is increased, cross-over circuit COM functions to provide a correspondingly increasing output voltage from terminals 8 and 10 to a predetermined value and then effects cross-over, that is, it then functions to maintain the output voltage at terminals 8 and 10 substantially constant and to provide an output voltage from terminals 12 and 14 which varies non-linearly with respect to the linearly variable input voltage. The output voltage at terminals 12 and 14 is arranged to vary non-linearly substantially in accordance with an average shunt motor field current-speed characteristic curve. Therefore, the output voltage from terminals 8 and 10 can be employed to control adjustment of the armature voltage and the output voltage from terminals 12 and 14 can be employed to control adjustment of the field current of a shunt motor to afford linear speed control relative to the input voltage.

As the reference voltage applied to input terminals 2 and 4 is increased, the output voltage at terminals 8 and 10 increases to a predetermined value which corresponds to a value required to control adjustment of the armature voltage of a motor to rated value. Thus, the output voltage at terminals 8 and 10 may be employed to control acceleration of the motor under armature voltage control. During this time, the voltage at output terminals 12 and 14 remains substantially at zero value. This is for the reason that diode ZD2 is a high impedance device and substantially all of the input voltage drop occurs thereacross and emitter E of transistor T2, therefore, is not biased for conduction. Further increase in the value of input voltage causes Zener diodes ZD1 and ZD2 to respond to effect current flow therethrough in the reverse directions. Diode ZD1 functions as a constant voltage device and maintains the output voltage at terminals 8 and 10 substantially constant with further increase in input voltage. Thus, further increase in input voltage causes greater current flow through diode ZD1 with constant voltage drop thereacross to maintain the positive emitter bias of transistor T1 constant.

When Zener diode ZD2 responds at the aforementioned value of input voltage, a positive emitter bias voltage is applied to transistor T2 in a circuit extending from common conductor 20 through resistor R4, emitter E and base B of transistor T2, diode ZD2 in the reverse direction and resistor R3 to input terminal 4 to render transistor T2 conducting. This effects current flow from common conductor 20 through resistor R4, emitter E and collector C of transistor T2 to terminal 6. The voltage drop across resistor R4 which corresponds to the low impedance output voltage of portion 18 of the cross-over circuit is applied through rheostat MF to output terminals 12 and 14. Resistor R4 also supplies negative feedback to transistor T2 to stabilize the output voltage at terminals 12 and 14.

FIG. 2 graphically shows the motor armature and shunt field characteristics which are required to afford linear speed adjustment by control of the armature voltage and field weakening. As shown in the upper portion of FIG. 2, wherein armature voltage is plotted against reference input voltage, linear speed control requires adjustment of the armature voltage linearly to rated value. While the armature voltage is adjusted, the field energization must be maintained constant at full value as shown in the lower portion of FIG. 2, wherein motor field current is plotted against reference input voltage. For further linear acceleration of the motor, the armature voltage must be maintained constant at rated value and the field energization must be decreased non-linearly in accordance with the shunt motor field current-speed characteristic curve which is non-linear due to the inherent characteristics of the motor as shown by broken curve in the lower portion of FIG. 2.

FIG. 3, wherein motor speed is plotted against field current, shows an average shunt motor field current-speed characteristic curve. It will be apparent from FIG. 3 that the motor speed varies non-linearly relative to the field current. The relation of the speed of the motor to the value of field current is such that acceleration in uniform incremental steps requires adjustment of the field current in progressively smaller decremental steps. In order to afford such non-linear adjustment of the field current, it is necessary to provide a reference output voltage which increases relative to the reference input voltage beyond the cross-over point as the field current decreases relative to the speed of the motor and vice versa as shown by the broken curve in FIG. 4. Such non-linear reference output voltage can then be employed to weaken the motor field energization to afford a change in motor speed which is proportional to a change in reference input voltage.

As hereinbefore described, the output voltage at terminals 8 and 10 of the cross-over circuit of FIG. 1, and consequently, the motor armature voltage controlled thereby increases linearly in response to increase in the reference input voltage through a first range of magnitude of the latter. When the output voltage at terminals 8 and 10 reaches a predetermined value proportional to rated armature voltage as shown in the upper portion of FIG. 2, cross-over takes place. That is, further increase in reference input voltage causes the output voltage at terminals 8 and 10 and, consequently, the armature voltage to remain constant at rated value; and an output voltage at terminals 12 and 14 which causes field weakening is initiated. While the output voltage at terminals 8 and 10 is increased, the output voltage at terminals 12 and 14 is maintained substantially at zero value. As a result, the field current controlled thereby is maintained constant at full value as shown in the lower portion of FIG. 2.

In FIG. 4, wherein reference input voltage $V_{in}$ is plotted against reference output voltage $V_{out}$, the solid curve shows the non-linear variation of the reference output voltage appearing at terminals 12 and 14 in response to increase of the reference input voltage. It will be apparent from FIG. 4 that during the increase of the reference input voltage up to the aforementioned cross-over value, the output voltage at terminals 12 and 14 remains constant. When the reference input voltage is increased beyond the cross-over point, the output voltage at terminals 12 and 14 increases in accordance with curve $n$ until the reference input voltage reaches value $x$. This increase in output voltage from portion 18 of the cross over circuit is employed to decrease the motor field energization in accordance with curve $n'$ shown in the lower portion of FIG. 2. At this point, Zener diode ZD3 responds to permit current flow in shunt of transistor T2. This shunt current is limited by resistor R5 so that further increase in the reference input voltage causes the output voltage at terminals 12 and 14 to increase in accordance with the curve $m$ in FIG. 4 until the reference input voltage is increased to value $y$. Thus, the response of diode ZD3 at point $x$ causes a decrease in the rate of change of output voltage relative to the input voltage. This change of rate of output voltage variation is employed to cause a corresponding change of rate of motor field weakening in accordance with curve $m'$ in the lower portion of FIG. 2.

At point $y$, Zener diode ZD4 responds to establish another circuit in shunt of transistor T2. This latter shunt current is limited by resistor R6 so that further increase in reference input voltage causes an increase in output voltage at terminals 12 and 14 in accordance with curve $o$ in FIG. 4. Thus, the response of diode ZD4 at point $y$ causes a further decrease in the rate of increase of output voltage in response to increase of reference input voltage. This rate of change of output voltage variation is employed to cause a corresponding change of rate of field weakening in accordance with curve $o'$ in the lower portion of FIG. 2.

It will be apparent that the actual output voltage of portion 18 of the cross-over circuit shown as curve $n$—$m$—$o$ in FIG. 4 very nearly corresponds to or approximates the desired output voltage shown by the broken curve. As a result, the reference output voltage at terminals 12 and 14 can be employed to weaken the motor field energization in accordance with curve $n'$—$m'$—$o'$ in the lower portion of FIG. 2 which very nearly corresponds to or approximates the desired field weakening curve shown by the broken line curve therein. Therefore, it is seen that a linear change in the magnitude of the reference input voltage in the armature control range affords a proportional change in motor speed. Also, a linear change in the magnitude of the reference input voltage in the field control range affords a linear change in motor speed in proportion thereto.

To afford the aforementioned linear speed control, the cross-over circuit renders the motor speed proportional to the reference input voltage in the field weakening range. Since $$N = \frac{1 + K_1 \cdot I_f}{K_2 \cdot I_f}$$

or $$I_f = \frac{1}{K_2 \cdot N - K_1}$$

where $N$=motor speed; $I_f$=field current; $K_1$=the slope of the saturation curve below saturation when field flux is plotted against field current or, in other words, the ratio of an increment of field flux to a corresponding increment of field current below the sauration point of the field; and $K_2$=maximum field flux.

Then, if $V_{in}$ (reference input voltage) is proportional to N and $V_{out}$ (reference output voltage at terminals 12 and 14) is proportional to $I_o-I_f$ or equal to $K(I_o-I_f)$ where $I_o$=full field current; and K is a constant for changing current to voltage;

$$V_{out} = K I_o - \frac{K}{K_2 \cdot N - K_1}$$

And since N is proportional to $V_{in}$, then $$V_{out} = K I_o - \frac{K}{K_2 \cdot V_{in} - K_1}$$

It will be apparent that the latter two empirical equations determine what the output voltage characteristics of portion 18 of the cross-over circuit should be to afford linear speed control of a given shunt motor.

While two Zener diodes have been shown for illustrative purposes, it will be apparent that a greater number may be employed if desired to afford field weakening more nearly in accordance with the field current-speed characteristic curve.

It will be apparent that the circuit hereinbefore described is extremely simple in construction and efficient in operation. The circuit enclosed in broken lines in FIG. 1 is arranged as a modular component circuit which is adapted for potting in plastic material because only long lasting elements are employed therein which do not require replacement over long periods of operational use. Terminals for connecting the circuit in a control system and the rheostat operator are provided externally of the module.

We claim:

1. In a voltage control system for providing two diversely controlled output voltages in response to an adjustable input voltage; a source of linearly adjustable input voltage; first output voltage control means comprising means responsive to said input voltage in a first range of adjustment thereof up to a predetermined magnitude for providing a first output voltage which varies in magnitude linearly in proportion to change in magnitude of said input voltage, and semi-conductor means responsive to said input voltage at said predetermined magnitude for maintaining the magnitude of said first output voltage substantially constant at a value proportional to said predetermined magnitude of input voltage as said input voltage is adjusted above said predetermined magnitude; and second output voltage control means comprising means responsive to said input voltage at said predetermined magnitude for initiating control of a second output voltage, and means responsive to said input voltage in a second range of adjustment thereof above said predetermined magnitude for causing the magnitude of said second output voltage to vary non-linearly in a relation whereby successive increments of input voltage magnitude afford respective increments of said second output voltage of successively decreasing magnitude proportionality and successive decrements of input voltage magnitude afford respective decrements of said second output voltage of successively increasing magnitude proportionality.

2. In a voltage control system for providing two diversely controlled output voltages in response to an adjustable input voltage; a source of linearly adjustable input voltage; first output voltage control means comprising means responsive to said input voltage in a first range of adjustment thereof up to a predetermined magnitude for providing a first output voltage which varies in magnitude linearly in proportion to change in magnitude of said input voltage, and means responsive to said input voltage at said predetermined magnitude for maintaining the magnitude of said first output voltage substantially constant at a value proportional to said predetermined magnitude of input voltage as said input voltage is adjusted above said predetermined magnitude; and second output voltage control means comprising semi-conductor means responsive to said input voltage at said predetermined magnitude for initiating control of a second output voltage, and means responsive to said input voltage in a second range of adjustment thereof above said predetermined magnitude for causing the magnitude of said second output voltage to vary non-linearly in a relation whereby successive increments of input voltage magnitude afford respective increments of said second output voltage of successively decreasing magnitude proportionality and successive decrements of input voltage magnitude afford respective decrements of said second output voltage of successively increasing magnitude proportionality.

3. In a voltage control system for providing two diversely controlled output voltages in response to an adjustable input voltage; a source of linearly adjustable input voltage; first output voltage control means comprising means responsive to said input voltage in a first range of adjustment thereof up to a predetermined magnitude for providing a first output voltage which varies in magnitude linearly in proportion to change in magnitude of the input voltage, and means responsive to said input voltage at said predetermined magnitude for maintaining the magnitude of said first output voltage substantially constant at a value proportional to said predetermined magnitude of input voltage as said input voltage is adjusted above said predetermined magnitude; and second output voltage control means comprising means responsive to said input voltage at said predetermined magnitude for initiating control of a second output voltage, and semi-conductor means responsive to said input voltage in a second range of adjustment thereof above said predetermined magnitude for causing the magnitude of said second output voltage to vary non-linearly, said non-linear variation comprising a relation whereby successive increments of input voltage magnitude afford respective increments of said second output voltage of successively decreasing magnitude proportionality such that said second output voltage has an increasing characteristic which approximates the shunt field decreasing-current versus increasing-speed characteristic curve of a direct current motor, and successive decrements of input voltage magnitude afford respective decrements of said second output voltage of successively increasing magnitude proportionality such that said second output voltage has a decreasing characteristic which approximates the shunt field decreasing-speed versus increasing-current characteristic curve of a direct current motor.

4. The invention defined in claim 3, wherein said second output voltage control means further comprises means for adjusting the maximum magnitude of said second output voltage.

5. In a non-linear voltage control system for use in controlling the field winding of a shunt wound direct current motor; a source of linearly adjustable input voltage; and an output voltage control circuit connected to said source comprising means responsive to said input voltage within a predetermined range of magnitude adjustment thereof for providing an output voltage, and semi-conductor means responsive to said input voltage at a plurality of different magnitude adjustments thereof within said range for causing the magnitude of said output voltage to vary non-linearly, said non-linear variation comprising an output voltage to input voltage relation whereby successive increments of input voltage magnitude afford respective increments of output voltage of successively decreasing magnitude proportionality and successive decrements of input voltage magnitude afford respective decrements of output voltage magnitude of successively increasing magnitude proportionality substantially in accordance with the equation $$V_{out} = KI_o - \frac{K}{K_2 \cdot V_{in} - K_1}$$

wherein $V_{out}$ is the magnitude of the output voltage, $V_{in}$ is the magnitude of the input voltage, $I_o$ is the magnitude of the full field current of the motor, $K_1$ is a predetermined constant proportional to the ratio of an increment of field flux to a corresponding increment of field current below the saturation point of the shunt field of such motor, $K_2$ is proportional to the field flux at the saturation point of the shunt field of such motor and K is a constant for changing current to voltage.

6. In a voltage cross-over system for providing two diversely controlled output voltages in response to an adjustable input voltage to be utilized for controlling the armature and field of a shunt wound direct current motor; a source of linearly adjustable input voltage; a first output voltage control circuit and a second output voltage control circuit connected to said source; said first circuit comprising means responsive to said input voltage in a first range of adjustment thereof up to a predetermined magnitude for providing a first output voltage which varies in magnitude linearly in proportion to change in magnitude of said input voltage; and said second circuit comprising semi-conductor means responsive to said input voltage in a second range of adjustment thereof above said predetermined magnitude for providing a second output voltage which varies non-linearly, said non-linear variation comprising a second output voltage to input voltage relation whereby successive increments of input voltage magnitude afford respective increments of said second output voltage of successively decreasing magnitude proportionality and successive decrements of input voltage magnitude afford respective decrements of said second output voltage of successively increasing magnitude proportionality approximately in accordance with the equation $$V_{out} = KI_o - \frac{K}{K_2 \cdot V_{in} - K_1}$$

wherein $V_{out}$ is the magnitude of the second output voltage, $V_{in}$ is the magnitude of the input voltage, $I_o$ is the magnitude of the full field current of the motor, $K_1$ is a predetermined constant proportional to the ratio of an increment of field flux to a corresponding increment of field current below the saturation point of the shunt field of such motor, $K_2$ is proportional to the field flux at the saturation point of the shunt field of such motor, and K is a constant for changing current to voltage; and semi-conductor means responsive to said input voltage at said predetermined magnitude thereof for effecting a cross-over of output voltage controls between said first and said second circuits.

7. In a voltage cross-over network for providing two diversely controlled output voltages in response to a variable input voltage, a source of linearly variable input voltage, a first output voltage control circuit and a second output voltage control circuit connected to said source, said first circuit comprising means responsive to said input voltage in a first range of magnitude thereof up to a predetermined value for providing a first output voltage which varies linearly in proportion to variation of said input voltage, said second circuit comprising means responsive to said input voltage in a second range of magnitude thereof above said predetermined value for providing a second output voltage which varies non-linearly in response to linear variation of said input voltage, and semi-conductor means responsive to said predetermined value of input voltage for effecting a transfer of adjustable output voltage control between said first and said second circuits.

8. The invention defined in claim 7, wherein said second circuit further comprises semi-conductor means effective in said first range of magnitude of said input voltage for rendering said means in said second circuit ineffective to provide an output voltage, and said first circuit further comprises semi-conductor means effective in said second range of magnitude of said input voltage for rendering said means in said first circuit effective to maintain said first output voltage substantially constant.

9. The invention defined in claim 7, wherein said means in said second circuit comprises electroresponsive means responsive to a plurality of different magnitudes of said variable input voltage in said second range of magnitude thereof for controlling said second output voltage non-linearly substantially in accordance with a predetermined characteristic curve.

10. The invention defined in claim 9, wherein said electroresponsive means comprises a plurality of Zener diodes successively responsive to different values of said input voltage in said second range of magnitude thereof for establishing circuits in shunt of said second output voltage providing means.

11. In a voltage cross-over network for providing two diversely controlled output voltages in response to a variable input voltage, a first output voltage control circuit and a second output voltage control circuit, means comprising input terminals for applying a variable input voltage to said first and second circuits in parallel, said first circuit comprising controllable semi-conductor means responsive to said variable input voltage in a first range of magnitude thereof up to a predetermined value for providing a first output voltage which varies in accordance with said input voltage, said first circuit further comprising a semi-conductor device responsive to said predetermined value of input voltage for maintaining the output voltage of said controllable semi-conductor means substantially constant with further increase in said input voltage above said predetermined value, said second circuit comprising second controllable semi-conductor means connected to said input terminals and a second semi-conductor device for maintaining said second semi-conductor means ineffective to provide an output voltage in response to said variable input voltage in said first range of magnitude thereof, said second semi-conductor device being responsive to said predetermined value of input voltage for rendering said second semi-conductor means effective to provide a second output voltage which varies at a first ratio in response to variation of said input voltage above said predetermined value, said second circuit further comprising a third semi-conductor device responsive to a predetermined higher value of said input voltage for rendering said second semi-conductor means effective to modify said second output voltage to vary at a second ratio in response to variation of said input voltage above said higher value, and a fourth semi-conductor device responsive to a predetermined still higher value of input voltage for rendering said second semi-conductor means effective to further modify said second output voltage to vary at a third ratio in response to variation of said input voltage above said still higher value, the response characteristics of said third and fourth semi-conductor devices being selected to provide said second output voltage with a variable characteristic which approximates the shunt field current-speed characteristic of a direct current motor.

12. The invention defined in claim 11, together with a rheostat connected to said second semi-conductor means and operable to adjust the maximum value of said second output voltage obtainable therefrom.

13. In a voltage cross-over network for providing two diversely controlled output voltages in response to a variable input voltage, a source of supply voltage, a first transistor connected across said source, a source of linearly variable input voltage for rendering said transistor conducting to provide a first output voltage which varies in accordance with said input voltage in a first range of magnitude of the latter, a Zener diode connected cross the control electrodes of said transistor and responsive to a predetermined value of said input voltage for controlling said transistor to maintain said first output voltage substantially constant, a second transistor connected across said supply source and having control electrodes connected to said input voltage source, a Zener diode in the input voltage control circuit of said second transistor for maintaining the latter ineffective to provide an output voltage in said first range of magnitude of said input voltage and responsive to said predetermined value of said input voltage for rendering said second transistor responsive to said input voltage thereby to provide a second output voltage which varies in accordance with variation of said input voltage above said predetermined value, and means comprisnig a plurality of Zener diodes connected in parallel across the control electrodes of said second transistor and successively responsive to different predetermined values of said variable input voltage in a second range of magnitude thereof above said predetermined value for controlling said second transistor to render said second output voltage variable non-linearly.

14. The invention defined in claim 13, together with a resistor in series with each of said plurality of Zener diodes for controlling the current through the latter thereby to control said second transistor and to render said second output voltage variable non-linearly substantially in accordance with the shunt field current-speed characteristic curve of a direct current motor.

References Cited in the file of this patent

UNITED STATES PATENTS

| | | |
|---|---|---|
| 2,246,294 | Cook | June 17, 1941 |
| 2,278,621 | Norcross | Apr. 7, 1942 |
| 2,987,429 | Jochems | July 28, 1959 |